United States Patent [19]

Abboud

[11] Patent Number: 5,450,801
[45] Date of Patent: Sep. 19, 1995

[54] FUEL GAS FROM INCINERATION PROCESS

[76] Inventor: Harry I. Abboud, 5845 Clematis Dr., Baton Rouge, La. 70808

[21] Appl. No.: 145,762

[22] Filed: Oct. 29, 1993

[51] Int. Cl.⁶ ............................................. F23B 7/00
[52] U.S. Cl. ................................. 110/203; 110/346; 110/344
[58] Field of Search ............... 110/203, 204, 215, 233, 110/342, 344, 345, 346

[56] References Cited

U.S. PATENT DOCUMENTS

| | | | |
|---|---|---|---|
| 2,025,891 | 12/1935 | Paulson | 110/346 |
| 4,599,953 | 7/1986 | Gould | 110/234 |
| 4,699,071 | 10/1987 | Vier et al. | 110/345 |
| 4,726,302 | 2/1988 | Hein et al. | 110/345 |
| 4,751,887 | 6/1988 | Terry et al. | 110/246 |
| 4,913,097 | 4/1990 | Derksen et al. | 122/4 D |
| 5,179,903 | 1/1993 | Abboud et al. | 110/345 |

Primary Examiner—Henry A. Bennet
Assistant Examiner—William C. Doerrler
Attorney, Agent, or Firm—Llewellyn A. Proctor

[57] ABSTRACT

An incineration process which can utilize any type of incineration means for disposing of hazardous, as well as non-hazardous, burnable waste. Such wastes include toxic combustible liquids, oil slurries, soils contaminated with dioxin, PCBs, creosote, or any other potentially toxic combustible material. In particular, the present invention relates to an incineration process which has no continuous stack discharge or pollution. This process provides an improved incineration means which conserves energy by reacting hazardous and non-hazardous waste with steam and oxygen to convert it into gaseous and/or solid fuel; cooling, compressing and recycling a portion of the fuel gas to the incinerator system to provide fuel for the incineration process, and to recover gases that can be used for production of chemicals or sold as fuel gas.

13 Claims, 1 Drawing Sheet

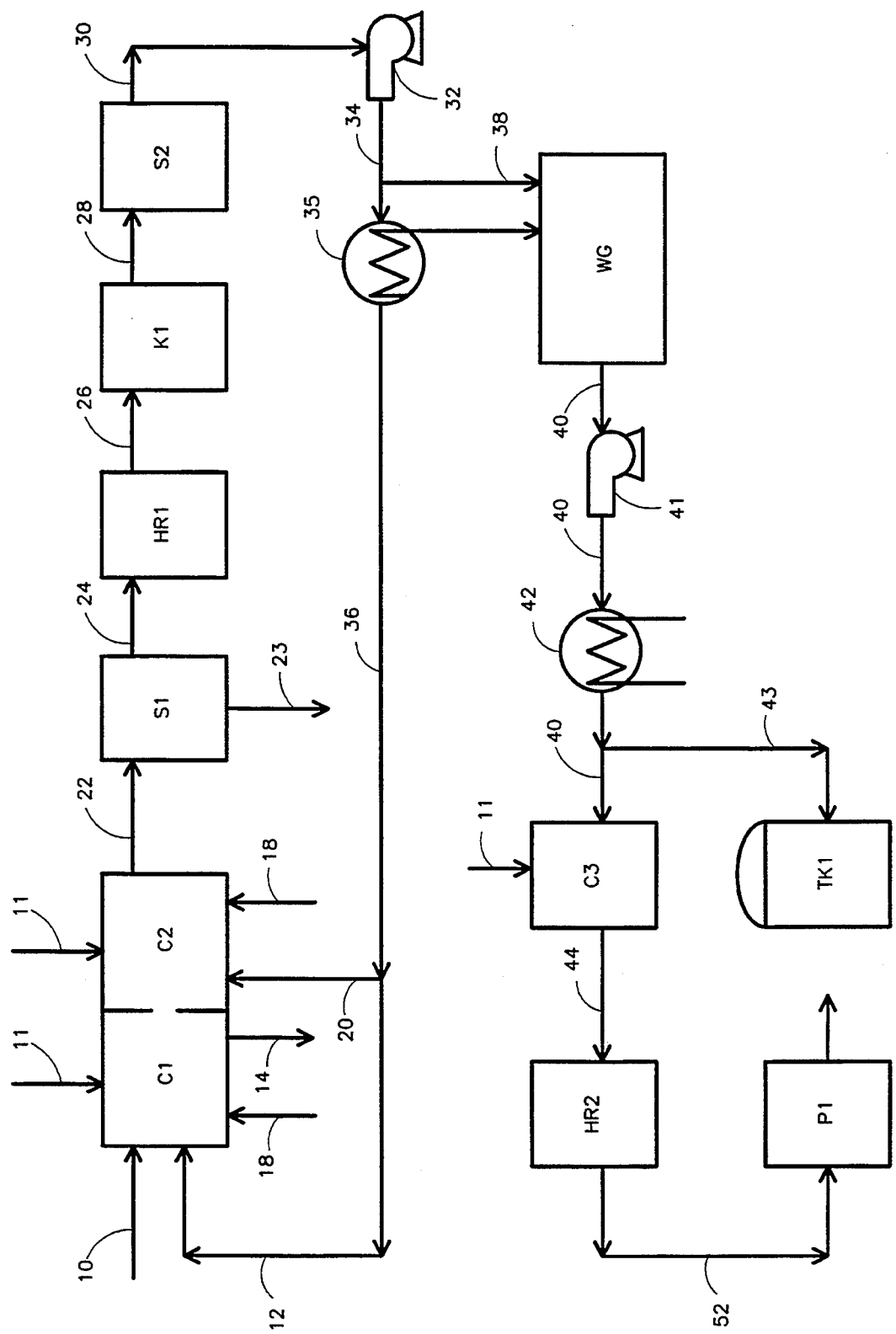

FUEL GAS FROM INCINERATION PROCESS

FIELD OF THE INVENTION

This invention relates to an improved incineration process which can utilize any type of incineration, or combustion, means for disposing of hazardous, as well as non-hazardous, burnable waste and converting at least a portion of it to a fuel or gaseous product. Such wastes include toxic combustible liquids, oil slurries, soils contaminated with dioxin, PCBs, creosote, or any other potentially toxic combustible material. The resulting fuel gas discharge from upstream combustion zone(s) can be collected or used to drive a downstream combustion zone or to produce chemicals.

BACKGROUND OF THE INVENTION

The disposal of hazardous waste is increasingly becoming a serious problem to industry as governmental regulations become tighter and tighter. Two leading technologies for disposing of hazardous wastes are landfills and combustion, or incineration. The terms "combustion" and "incineration" are used interchangeably herein. While the industry has historically preferred landfills over incineration, primarily because of cost, incineration is becoming more attractive. One reason tier this is because governmental regulations regarding landfills are becoming more restrictive. For example, in 1989 a new extended list of chemical streams which are banned from landfills went into effect. As industry turns toward incineration as the primary means of disposing of hazardous waste, they are also faced with tougher and tougher incineration restrictions. For example, the destruction and removal efficiency (DRE) ratings for incineration are presently set at 99.99% of most hazardous waste, and 99.9999% for polychlorinated biphenyls (PCBs).

This has created a substantial problem for industry. For example, in the petrochemical and oil producing states, the problem of cleaning-up contaminated sites and waste-oil pits is already of paramount importance, and is becoming even more acute. The quantity of waste oil contamination at oil field drilling sites has become a problem of great magnitude. The necessity of hauling the accumulated contaminated material from wide spread areas of contamination to a central decontamination site aggravates the problem considerably. Likewise, the problem of cleaning up abandoned petrochemical sites is even more severe.

The problem is particularly severe when hazardous waste is burned. This is because not only must the waste be disposed of before harm is done to the environment, but additionally, the destruction of any potentially toxic chemicals must be sufficiently complete so that the gases which evolve are non-hazardous. To completely decompose most of these chemicals, relatively highly efficient and high temperature combustion is needed to lower the cost of incineration, which is typically expensive.

The discharge stack emissions from an incineration means are typically of important concern for several reasons. For one reason, the public views stack emission plumes with suspicion and fears that the incinerator operator is discharging hazardous, or toxic gases into the atmosphere. Another reason is that the federal and state authorities have regulations governing stack emissions with regular monitoring, testing, and validation to insure that prescribed emission limits are not being exceeded.

U.S. Pat. No. 5,179,903 teaches a multistage closed loop incineration process for disposing of waste material wherein a portion of the resulting fuel gas stream is enriched with oxygen and recycled to the incineration means. The portion is scrubbed to remove acid gases and passed through a purification zone wherein any remaining contaminants are removed. This patent does not teach converting the waste to a fuel or gaseous product which can be either collected to produce chemicals or used to fuel a downstream combustion zone, such as a boiler, furnace, an internal combustion engine.

Therefore, there is a substantial need in the art for improved incineration processes which are able to meet the present destruction and removal efficiency requirements, as well as requirements in the foreseen future.

SUMMARY OF THE INVENTION

In accordance with the present invention, there is provided an improved process for combusting waste materials so that said materials are destroyed and gaseous products and/or fuels are produced and substantially none of the contaminants are released into the environment. The process comprises:

(a) feeding combustible waste material into a combustion zone where they are reacted with oxygen, steam, and recycled fuel gas at a temperature from about 1400° F. to about 2500° F. at substoichiometric conditions with respect to oxygen, thereby partially burning said waste material and producing a fuel or gaseous product;

(b) passing the resulting fuel gases from said combustion zone to a separation zone where particulate matter is removed;

(c) passing the fuel gases from the separation zone to a heat recovery zone where the temperature of the fuel gases is lowered to 900° F. to 1600° F. and process steam is generated;

(d) passing the cooled fuel gases from the heat recovery zone to a cooling zone where it is cooled by 300° F. to 600° F.;

(e) passing the fuel gas stream from said cooling zone to a separation zone where particulate matter is removed;

(f) cooling, compressing, and recycling a portion of the so treated fuel gas to said combustion zone;

(g) passing the remaining portion of said fuel gas to a wet gas scrubbing zone containing an aqueous alkaline solution or slurry wherein acid gases and other contaminants are removed; and (h) collecting the so treated fuel gas for sale, or for the production of other chemicals, or for hydrogenation operations.

In a preferred embodiment of the present invention, the combustion zone is staged so that there is a first combustion zone operated at a temperature from about 1400° F. to about 2200° F., and a second combustion zone operated at a temperature from about 1800° F. to about 2500° F.

In another preferred embodiment of the present invention, the cooling zone is operated by spraying an aqueous medium containing alkaline and acid salts from a downstream wet gas scrubbing zone.

In still another preferred embodiment of the present invention, ammonia is injected into the fuel gas stream prior to it entering the cooling zone.

In yet another preferred embodiment of the present invention, after step (g) the fuel gas is combusted in a downstream combustion zone to produce steam or electricity, or to produce mechanical work, or to supply heat to a chemical process.

BRIEF DESCRIPTION OF THE DRAWING

The sole drawing hereof is a flow diagram of a preferred embodiment of the incineration process of the present invention.

DETAILED DESCRIPTION OF THE INVENTION

Any combustible hazardous and non-hazardous waste material may be incinerated by the practice of the present invention. Non-limiting examples of such materials include toxic combustible liquids, oil slurries, soils contaminated with dioxin, creosote, PCBs, and any other potentially toxic combustible material.

The present invention can be best understood by reference to the sole drawing hereof. Combustible waste material is fed via line 10 into first combustion zone C1 where it is partially combusted with oxygen and steam, respectively, being added via liner 11, 18. The combustion may be achieved by any acceptable combustion device. Non-limiting combustion devices include boilers, furnaces and kilns. The combustion zone is maintained at substoichiometic conditions with respect to oxygen and at a temperature from about 1400° F. to about 2500° F., preferably from about 1600° F. to about 2200° F., and more preferably from about 1800° F. to about 2100° F. This results in a fuel gas which is combustible or burnable. The term "substoichiometric" as used herein means less than that amount of oxygen needed to fully combust, or burn the waste material. That is, if a stoichiometric amount of oxygen is taken as being 100% to fully burn the waste material, then less than 100% will be used in the combustion zone of the present invention, preferably from about 60 to 95%, more preferably from about 60 to 90%, and most preferably from about 60 to 85%.

It will be understood that it may be more practical, from a commercial point of view, that the combustion zone be comprised of two combustion stages. It will also be understood that even if more than one combustion stage is used they can be operated in one or more combustion devices. That is, a single furnace can be used containing multiple combustion stages so that one stage of the furnace is operated at a different temperature from another stage. If two combustion stages are employed it is preferred that the first combustion stage be operated at a temperature from about 1400° F. to 2200° F., preferably from about 1600° F. to 2200° F., and more preferably from about 1800° F. to 2100° F. The second combustion stage will be maintained at a temperature from about 1800° F. to about 2500° F., preferably from about 1900° F. to about 2300° F., and more preferably at temperatures in excess of 2000° F. This second combustion stage is also run at substoichiometric conditions with respect to oxygen. It is also preferred that the second combustion stage be operated at a temperature in excess of 100° F., preferably 200° F., and more preferably 300° F. higher than that of said first combustion zone. Additional combustible waste material may be introduced into the second combustion stage.

Substoichiometric combustion results in incandescent carbon and a gaseous discharge having fuel value and steam reaction with the carbon produces CO and H, hereinafter referred to as fuel gas. A portion of this fuel gas can be recycled to the combustion zone after cooling and particulate removal via line 12. A suitable auxiliary fuel may also be used in addition to this recycle fuel gas, which auxiliary fuel may be any fuel which is capable of maintaining the combustion temperatures as previously mentioned. Ash is removed from combustion zone C1 via line 14. It is understood that the fuel gas from the combustion zone may be passed through a cyclone separator, or another type ash removal system, prior to entering the second combustion zone. The fuel gas from combustion zone C1 is passed via line 22 to separation zone S 1 wherein particulate material is separated from said fuel gas and collected via line 23. This separation zone can be a so-called "bag-house" wherein particulate matter is collected on or inside the bags for disposal.

The fuel gas is passed from the separation zone to heat recovery zone HR1 via line 24 wherein steam or other usefill process heat is produced. The fuel gas is then passed via line 26 to a cooling zone K1 where it is contacted with an aqueous solution of alkaline and/or acid salts and is cooled by 300° F. to 600° F. These salts are derived from a downstream wet scrubbing zone and will typically be atomized or spray dried into said cooling zone as the fuel gas enters said zone. The so treated fuel gas is passed from cooling zone K1 via line 28 to separation zone S2 for removing entrained solids, which will typically be alkaline and/or acid salts picked up in cooling zone K1. This separation zone can be a so-called "bag-house" wherein particulate matter is collected on or inside the bags for disposal.

One alternative to the process shown in the figure is cooling the gases in an evaporative cooler and then dry scrubbing the gases with $Al_2O_3$ or $Al_2O_3.3H_2O$ to produce $AlCl_3$.

A second alternative to the process scheme shown in the figure is to inject ammonia into line 26 upstream of cooling zone K1. This will also remove acid gases from the stream.

A third alternative method for acid removal is to scrub the gases with water to produce dilute acid product.

The remaining fuel gas is passed from separation zone S2 via line 30 to blower or compressor 32 to provide enough compressing action to keep the pressure of the stream in an operable range to keep the streams flowing. After compression, the fuel gas stream is split into two portions. One portion is routed via line 34, for recycling, back to the first combustion zone C1 via lines 36 and 12 and/or second combustion zones via line 36 and 20. It is preferred that before it is recycled it first pass through cooler 35. It will be understood that the fuel gas can be passed through a cooler either before, after, or both, of the compressor. As previously mentioned the fuel gas can now be passed to the first, second, or both combustion zones as indicated.

The other portion of the fuel gas stream is passed from compressor 32 via line 38 to wet scrubbing zone WG wherein acid gases are removed by contacting the fuel gas stream with an aqueous alkaline scrubbing solution. The scrubbed fuel gas is then passed via line 40 through compressor 41 and cooler 42 after which it can now be collected via line 43 and stored in TK1 as a commercial fuel product which can be used for the generation of other chemicals, such as methanol, ammonia, etc. it can also be used to drive a downstream combustion zone C3 where it is combusted at at least stoichiometric conditions with respect to oxygen added via line 11. That is, in the presence of enough oxygen to fully combust the fuel gas. This downstream combustion zone is preferably a boiler, furnace, internal combustion engine, or gas turbine. It is preferred that the downstream combustion zone be an internal combustion engine or gas turbine, more preferably an internal combustion engine.

Having described the invention, what is claimed is:

1. A process for combusting hazardous waste materials to produce a mixture of carbon monoxide and hydrogen gas from which substantially all of the contaminants are removed which comprises:
    (a) feeding a combustible waste material into a combustion zone where it is reacted with oxygen, steam and recycled gas at a temperature of from about 1400° F. to about 2500° F. at substoichiometric conditions with respect to oxygen, thereby partially burning said waste material and producing a gaseous mixture which consists essentially of carbon monoxide and hydrogen;
    (b) passing the resulting gaseous mixture from said combustion zone to a separation zone where particulate matter is removed;
    (c) passing the gaseous mixture from the separation zone to a heat recovery zone where the temperature of the gaseous mixture is lowered to 900° F. to 1600° F. and process steam is generated;
    (d) passing the cooled gaseous mixture from the heat recovery zone to a cooling zone where it is cooled by 300° F. to 600° F.;
    (e) passing the gaseous mixture from said cooling zone to a separation zone where particulate matter is removed;
    (f) cooling, compressing, and recycling a portion of the so treated gaseous mixture to said combustion zone;
    (g) passing the remaining portion of said gaseous mixture to a wet gas scrubbing zone containing an aqueous solution or slurry wherein acid gases and other contaminants are removed; and
    (h) collecting the so treated gaseous mixture of carbon monoxide and hydrogen for sale, or for the production of chemicals, or for hydrogenation operations.

2. The process of claim 1 wherein the combustion zone is comprised of two stages.

3. The process of claim 2 wherein the first stage is operated at a temperature from about 1400° F. to 2200° F. and the second stage is operated at a temperature from about 1800° F. to 2500° F.

4. The process of claim 3 wherein the temperature of the first combustion zone is from about 1900° F. to about 2100° F.

5. The process of claim 4 wherein the temperature of the second combustion zone is from about 2000° F. to about 2300° F., with the proviso that it be at least 100° F. higher than that of the first combustion zone.

6. The process of claim 3 wherein the gaseous mixture from the first combustion zone is passed through a cyclone separation before entering the second combustion zone.

7. The process of claim 1 wherein the gaseous mixture from the wet scrubbing zone of step (g) is passed to a purification zone containing one or more of the following stages: (i) a stage for removing CO and hydrocarbon gases; (ii) a stage for removing additional acid gases; and (iii) a stage for removing HCl, $SO_x$, $NO_x$, and S.

8. The process of claim 1 wherein an effective amount of ammonia is injected into the gaseous mixture between the heat recovery zone and the cooling zone.

9. The process of claim 7 wherein the stage for removing CO and hydrocarbon gases is comprised of an organic solvent.

10. The process of claim 7 wherein the stage for removing additional acid gases is comprised of an alkaline scrubbing solution.

11. The process of claim 7 wherein the stage for removing HCl, $SO_x$, $NO_x$, and S is comprised of activated carbon or a molecular sieve.

12. The process of claim 8 wherein the stage for removing additional acid gases is comprised of an alkaline scrubbing solution and the stage for removing HCl, $SO_x$, $NO_x$, and S is comprised of activated carbon.

13. The process of claim 7 wherein the temperature of the first combustion zone is from about 1900° F. to about 2100° F. and the temperature of the second combustion zone is from about 2000° F. to about 2300° F., with the proviso that the second combustion zone be operated at a temperature which is at least 100° F. higher than that of the first combustion zone.

* * * * *